Patented Oct. 11, 1949

2,484,057

UNITED STATES PATENT OFFICE 2,484,057

PROCESS FOR PRODUCING DI(ALKOXY-PHENYL) HALOETHANE

David A. Shirley, Wilmington, Del., assignor to E. I. du Pont de Nemours & Company, Wilmington, Del., a corporation of Delaware No Drawing. Application September 26, 1946, Serial No. 699,596

5 Claims. (Cl. 260—613)

This invention relates to the manufacture of di(alkoxyphenyl)haloethanes. It is more particularly directed to processes for condensing alkyl phenyl ethers and halogenated acetaldehydes by mixing the ether, the aldehyde, and an anhydrous condensing agent selected from the group comprising aluminum chloride, aluminum bromide, aluminum iodide, boron trifluoride, and hydrogen fluoride to form a homogeneous liquid reaction medium containing the condensing agent in solution, the ether and aldehyde being employed in the proportions of at least 2 moles of ether for each mole of aldehyde.

This application is a continuation-in-part of my copending application Serial No. 657,624 filed March 27, 1946, now abandoned.

It is an object of this invention to provide processes for obtaining di(alkoxyphenyl)haloethanes in high yields. A further object is to provide processes which do not require sub-zero reaction temperatures. It is a still further object to provide processes which do not require the use of a hazardous diluent, such as carbon disulfide, or similar diluents. Still further objects will become apparent hereinafter.

The foregoing and other objects of the invention are attained by mixing an alkyl phenyl ether and a halogenated acetaldehyde, in the proportions of at least 2 moles of the ether for each mole of the aldehyde, with a condensing agent selected from the group comprising aluminum chloride, aluminum bromide, aluminum iodide, boron trifluoride, and hydrogen fluoride, to form a homogeneous liquid reaction medium in which the condensing agent is dissolved.

The alkyl radical of the alkyl phenyl ethers suitable for use in this invention may be a straight or branched chain. For practical reasons, alkyl groups having 1 to 12 carbon atoms are preferred but the invention is not restricted thereto. Suitable alkyl groups are, for example, methyl, ethyl, propyl, isopropyl, butyl, isobutyl, amyl, hexyl, octyl, decyl, and dodecyl. The ring portion of the ether may contain 1 to 4 substituents. Preferably, such substituents are nitro radicals or alkyl or alkoxy groups containing less than 6 carbon atoms; for example, such alkyl radicals as methyl, ethyl, propyl, isopropyl, butyl, and amyl, and the corresponding alkoxy radicals.

The halogenated acetaldehydes suitable for use in this invention are the mono-, di-, or tri-haloacetaldehydes. Illustrative of the common members of this class are chloral, bromal, dichloroacetaldehyde, and monochloroacetaldehyde.

Condensing agents suitable for use in the processes of the invention are as heretofore mentioned, the anhydrous chemicals, aluminum chloride, aluminum bromide, aluminum iodide, boron trifluoride, and hydrogen fluoride. These halides all have the common characteristic of being completely soluble in the reaction medium in amounts up to at least 1 mole of the halide for each mole of chloral used. It may be that this is not a true solubility of the compound in the reaction medium but is rather the result of the formation of soluble halide complexes. Regardless of whether it is a true solution of the condensing agents in the reaction mass or whether halide complexes are formed, it is to be noted that according to the processes of this invention the condensing agent is not present in the reaction medium in a separate phase but is apparently in solution.

The invention may be practiced by bringing together the reactants in the presence of one of the aforementioned condensing agents in the proportions of about 2 moles of an alkyl phenyl ether for each mole of a halogenated acetaldehyde. It is preferred, however, for practical reasons that a more dilute reaction medium be employed since otherwise the mass becomes extremely viscous and difficult to handle during the condensation.

A suitably fluid medium is maintained thruout the condensation reaction by employing at least 1½ times the theoretical amount of the ether; that is, at least 3 moles of ether for each mole of the aldehyde. Although it is preferable to use an excess of ether to serve as a diluent and solvent in the reaction mass, one may use other organic solvents which form a solution with the ether and chloral and do not interfere with the condensation reaction and which, in addition, yield a fluid mixture in which the condensing agent and the product formed are soluble. Typical of suitable diluents are nitrobenzene, nitrotoluenes, and diethyl ether.

The reagents may be brought together by dissolving the condensing agent in the ether and then adding the aldehyde, or, alternatively, the ether and aldehyde may be mixed and the condensing agent added later. It is undesirable to mix the condensing agent with the aldehyde in the absence of the ether.

In practicing the invention, it is preferred to use at least 0.25 mole of condensing agent for each mole of aldehyde and more preferably from about 0.25 to 1 mole of condensing agent for each mole of aldehyde, although the invention is not limited in this respect. Smaller amounts of condensing agent may be used so long as the condensation is effected in a homogeneous liquid reaction medium in which the condensing agent is soluble. The condensing agent may, of course, be employed in amounts larger than 1 mole per mole of aldehyde but there is no advantage in this since the cost is increased without improving the yield.

According to a preferred embodiment of the invention, a suitable condensing agent, such as anhydrous aluminum chloride, is added to an alkyl phenyl ether in the proportions of 0.25 to 1 mole of anhydrous aluminum chloride for about 3 to 4 moles of the ether with agitation and cooling to 30°–60° C. A halogenated acetaldehyde is added to the solution so obtained in the proportion of about 1 mole of the aldehyde for each 0.25–1.0 mole of the condensing agent. The aldehyde is added gradually, either intermittently or continuously, to the reaction mass with agitation and cooling at such rate as to keep the temperature within the range of from about 30° to 60° C. After completing the addition of the aldehyde, agitation is continued for a time in order to assure completion of the condensation reaction. The time of additional agitation so required will vary somewhat with the amount of condensing agent used and the reaction temperature, smaller amounts of condensing agent and lower temperatures requiring more extended reaction time.

The reaction mass is then mixed with water to destroy the aluminum chloride complex which appears to be formed during the condensation and dissolve the aluminum chloride in an aqueous solution leaving the product dissolved in the excess ether employed. Preferably, this step is carried out by adding the reaction mass carefully and with agitation to an excess of water because of the highly exothermic reaction which occurs. The organic layer thus freed of aluminum chloride may be separated from the aqueous solution and subjected to distillation preferably under vacuum to remove the excess ether, thereby leaving the molten product which may be washed further with water or dilute alkaline solutions and granulated or cast. The solid product may be further purified by recrystallization.

Alternatively, after adding the reaction mass to the water, the excess ether may then be separated by steam distillation and that step followed by the separation of the product from the remaining aqueous solution. The product, as before, may be washed further, granulated, cast, and if desired, recrystallized.

The invention may be more fully understood by reference to the following examples.

*Example 1*

Twenty-six and six-tenths (26.6) parts by weight of anhydrous aluminum chloride was dissolved in 97.6 parts by weight of phenetole with stirring and cooling to maintain the temperature below about 45° C. and 39.6 parts by weight of chloral was added to the resulting solution over a 30-minute period. Agitation and indirect cooling was employed to keep the temperature of the reaction mass at 30°–35° C. This example provided that the components be employed in the proportions of about 3 moles of phenetole and about 0.75 mole of anhydrous aluminum chloride for each mole of chloral. The completed reaction mass was added slowly with agitation to 200 parts by weight of water. The mixture so obtained was subjected to steam distillation and 27 parts by weight of phenetole were recovered in the distillate. The product remaining behind in mixture with water solidified on cooling and was filtered and washed with water to give 99 parts by weight of white solid crude 2,2-bis-(4-ethoxyphenyl)-1,1,1-trichloroethane melting at 99°–103° C. Recrystallization of the product from a mixture of methanol and benzene gave a purified material melting at 103–5° C.

*Example 2*

Anisole, 21.6 parts by weight, was mixed with 75 parts by weight of anhydrous hydrogen fluoride. Fourteen and eight-tenths (14.8) parts by weight of chloral was added to the solution so obtained over a period of 10 minutes. The temperature of the reaction mass was controlled substantially at the boiling point of hydrogen fluoride by allowing the excess hydrogen fluoride to boil off during the addition of the chloral. The reaction mixture was then mixed with a large excess of water, the water layer separated off, and the remaining organic layer was washed two additional times by decantation. The liquid product was then added to about an equal volume of methanol with agitation at room temperature. While solid 2,2-bis-(4-methoxyphenyl)-1,1,1-trichloroethane precipitated upon addition to the methanol. Eighteen and three-tenths (18.3) parts by weight of the product melting at 82–3° C. was recovered.

*Example 3*

Thirty-five and five tenths (35.5) parts by weight of dichloroacetaldehyde was added at 30–35° C. to a solution of 41.7 parts by weight of anhydrous aluminum chloride in 136 parts by weight of anisole, the components thus being employed in the proportion of about 4 moles of the anisole and 1 mole of the anhydrous aluminum chloride for each mole of dichloroacetaldehyde. The chloraldehyde was added over a 20-minute period. After treatment with excess water, the resulting mass was steam distilled to remove the excess anisole and the remaining organic layer was added to about an equal volume of methanol whereby 78.2 parts by weight of white solid crude 2,2-bis-(4-methoxyphenyl)-1,1,-dichloroethane was obtained melting at 105–8° C. The melting point of the product was increased to 116–7.5° C. by recrystallization from a mixture of benzene and alcohol.

*Example 4*

Gaseous boron trifluoride was introduced into 216 parts by weight of anisole until 14 parts by weight of the boron trifluoride had been absorbed. A total of 74 parts by weight of chloral was added to the solution obtained over a 20-minute period with agitation and cooling to maintain the reaction mass at a temperature of 35–40° C. The reaction mass was maintained at 35–40° C. for about 1½ hours after completion of the chloral addition and was then added to 400 parts by weight of water with stirring. The immiscible mixture of water and organic liquid obtained was subjected to steam distillation to remove the excess anisole employed in the process. At the completion of steam distillation, the molten organic product layer was mixed with about an equal volume of methanol and the white crystalline 2,2-bis-(4-methoxyphenyl) - 1,1,1 - trichloroethane precipitated therein. One-hundred and twenty (120) parts by weight of the product was obtained.

*Example 5*

Fifty-two and four-tenths (52.4) parts by weight of dodecyl phenyl ether was added to a solution of 13.3 parts by weight of anhydrous aluminum chloride in 100 parts by weight of nitrobenzene. Chloral, 14.8 parts by weight, was then added over a period of 30 minutes, maintaining the temperature of the reaction mass at 30–35° C. The mixture was stirred for 30 minutes after the completion of the chloral addition and was then mixed with an excess of cold water. Steam distillation gave a recovery of 90 parts by weight of nitrobenzene. The residual oil solidified on cooling and was isolated by filtration and washing with water. There was obtained 49.9 parts by weight of crude 2,2-bis-(4-dodecyloxyphenyl)-1,1,1-trichloroethane, a tan waxy solid melting at 55–63° C. This material could not be recrystallized from the common solvents.

*Example 6*

Chloral, 29.6 parts by weight, was added to a solution of 55.2 parts by weight of the dimethyl ether of hydroquinone and 26.6 parts by weight of anhydrous aluminum chloride in 238 parts by weight of nitrobenzene over a period of 30 minutes with external cooling to hold the temperature of the reaction mass around 35° C. After stirring for another 30 minutes, the mixture was added to an excess of water with agitation and the resulting mixture was subjected to steam distillation for removal of the nitrobenzene. The oily product layer remaining was mixed with about an equal volume of methanol and the product precipitated. The product, 2,2-bis-(dimethoxyphenyl)-1,1,1-trichloroethane was separated by filtration, weighed 38 parts by weight, and melted at 118–20° C. Recrystallization from alcohol gave white prisms, M. P. 120–1° C.

Analysis: Calcd. for $C_{18}H_{21}Cl_3O_4$: Cl, 26.3. Found: Cl, 26.5 and 26.7.

*Example 7*

Chloral, 29.6 parts by weight, was added slowly with stirring to a solution of 53.4 parts by weight of anhydrous aluminum tribromide in 86.4 parts by weight of anisole, maintaining the temperature of the reaction mass between 35–45° C. Stirring was continued for 15 minutes after completion of the addition of chloral and the reaction mass was then added to an excess of water with vigorous stirring. After steam distillation to remove the excess anisole, the oily residue was mixed with about an equal part by volume of methanol and the crystalline product obtained was filtered off and dried. There was obtained 61 parts by weight of 2,2-bis-(4-methoxyphenyl)-1,1,1-trichloroethane melting at 82–3.5° C.

I claim:

1. In a process for the manufacture of di-(alkoxyphenyl)haloethane by condensing alkyl phenyl ether, the alkyl radical of which contains less than 13 carbon atoms, with a trihaloacetaldehyde, the step comprising mixing the ether, the aldehyde, and an anhydrous condensing agent selected from the group comprising aluminum chloride, aluminum bromide, aluminum iodide, boron trifluoride, and hydrogen fluoride, in the proportions of at least 3 moles of the ether and at least 0.25 mole of the condensing agent for each mole of the aldehyde to form a homogeneous liquid reaction medium in which the condensing agent is dissolved.

2. In a process for the manufacture of di-(alkoxyphenyl)trihaloethane by condensing alkylphenyl ether, the alkyl radical of which contains less than 13 carbon atoms, with trihaloacetaldehyde, the steps comprising mixing the ether, the aldehyde, and an anhydrous condensing agent selected from the group comprising aluminum chloride, aluminum bromide, aluminum iodide, boron trifluoride, and hydrogen fluoride, in the proportions of about 3 to 4 moles of the ether and about 0.25 to 1 mole of the condensing agent to obtain a homogeneous liquid reaction medium in which the condensing agent is dissolved, and agitating and cooling to maintain the temperature between about 30° C. and 60° C.

3. In the preparation of 2,2-bis-(4-methoxyphenyl)-1,1,1-trichloroethane by condensing anisole and chloral, the steps comprising mixing the anisole, the chloral, and anhydrous boron trifluoride in the proportions of about 3 to 4 moles of the anisole and about 0.25 to 1 mole of boron trifluoride for each mole of chloral to form a homogeneous liquid reaction medium in which the boron trifluoride is dissolved, and agitating and maintaining the reaction medium at a temperature of about 30° C. to 60° C.

4. In the preparaton of 2,2-bis-(4-methoxyphenyl) - 1,1,1 - trichloroethane by condensing anisole and chloral, the steps comprising mixing the anisole, the chloral, and anhydrous hydrogen fluoride in the proportions of about 3 to 4 moles of the anisole and about 0.25 to 1 mole of hydrogen fluoride for each mole of chloral to form a homogeneous liquid reaction medium in which the hydrogen fluoride is dissolved, and agitating and maintaining the reaction medium at a temperature of about 30° C. to 60° C.

5. In the preparation of 2,2-bis-(4-methoxyphenyl) - 1,1,1 - trichloroethane by condensing anisole and chloral, the steps comprising mixing the anisole, the chloral, and anhydrous aluminum tribromide in the proportions of about 3 to 4 moles of the anisole and about 0.25 to 1 mole of aluminum tribromide for each mole of chloral to form a homogeneous liquid reaction medium in which the aluminum tribromide is dissolved, and agitating and maintaining the reaction medium at a temperature of about 30° C. to 60° C.

DAVID A. SHIRLEY.

REFERENCES CITED

The following references are of record in the file of this patent:

Frankforter et al.: "J. Am. Chem. Soc.," vol. 36, pages 1511–1529 (1914).

Elbs: "Jour. für Praktische Chemie," vol. 47, page 68 (1893).

Fritsch et al.: "Annalen der Chemie," vol. 306, page 77 (1899).

Prill et al.: "Science," vol. 101, pages 464–465 (1945).

Harris et al.: "Jour. Am. Chem. Soc.," vol. 48 (1926), pages 3144–3150.

Thomas: "Anhydrous Aluminum Chloride in Organic Chemistry" (1941), pages 24–26 and 878, Reinhold, N. Y., publisher.

Callaham: "Chem. and Met.," vol. 51 (1944), page 114.